(12) United States Patent
Tsai (10) Patent No.: US 11,535,335 B2
(45) Date of Patent: Dec. 27, 2022

(54) SHOCK ABSORBING SYSTEM FOR BICYCLE FRONT FORK

(71) Applicant: Ming-Ta Tsai, New Taipei (TW)

(72) Inventor: Ming-Ta Tsai, New Taipei (TW)

(*) Notice: Subject to any disclaimer, the term of this patent is extended or adjusted under 35 U.S.C. 154(b) by 303 days.

(21) Appl. No.: 16/898,542

(22) Filed: Jun. 11, 2020

(65) Prior Publication Data

US 2021/0387693 A1 Dec. 16, 2021

(51) Int. Cl.

| | |
|---|---|
| *B62K 25/08* | (2006.01) |
| *F16F 9/36* | (2006.01) |
| *F16F 9/43* | (2006.01) |
| *F16F 9/44* | (2006.01) |
| *F16F 9/32* | (2006.01) |
| *F16F 9/18* | (2006.01) |
| *B62K 25/04* | (2006.01) |

(52) U.S. Cl.
CPC ............. *B62K 25/08* (2013.01); *F16F 9/185* (2013.01); *F16F 9/3221* (2013.01); *F16F 9/36* (2013.01); *F16F 9/43* (2013.01); *F16F 9/44* (2013.01); *B62K 2025/048* (2013.01); *F16F 2222/12* (2013.01); *F16F 2228/066* (2013.01); *F16F 2230/186* (2013.01)

(58) Field of Classification Search
CPC ..... B62K 25/08; B62K 2025/048; F16F 9/36; F16F 9/43; F16F 9/44; F16F 9/46; F16F 9/185; F16F 2222/12; F16F 2228/066; F16F 2230/186

USPC ................................................. 280/275, 276
See application file for complete search history.

(56) References Cited

U.S. PATENT DOCUMENTS 7,891,645 B2 * 2/2011 Schroeder ............... F16F 1/121
267/203
2017/0305494 A1 * 10/2017 Tsai ....................... F16F 9/3242

FOREIGN PATENT DOCUMENTS

EP 3786478 A1 * 3/2021 .............. F16F 9/466

* cited by examiner

*Primary Examiner* — Christopher P Schwartz (57) ABSTRACT

A shock absorbing system for a bicycle front fork includes an outer tube and an inner tube which includes a piston located therein, and the lower end of the inner tube is movably inserted into the outer tube. A piston tube is connected between the lower end of the outer tube and the piston. The inner tube includes a first chamber and a second chamber formed therein with the piston located between the first and second chambers. A path formed between the piston and the piston tube. A manual valve is located in the piston tube and includes a rod and a movable part. The rod includes an extension section protruding beyond the outer tube. When the extension section is pushed, the rod moves upward to switch the path from a sealed status to an opened status, and the first chamber communicates with the second chamber.

7 Claims, 10 Drawing Sheets

SHOCK ABSORBING SYSTEM FOR BICYCLE FRONT FORK

BACKGROUND OF THE INVENTION

1. Fields of the Invention

The present invention relates to a shock absorbing system for a bicycle front fork, and more particularly, to a.

2. Descriptions of Related Art

Figure 16:
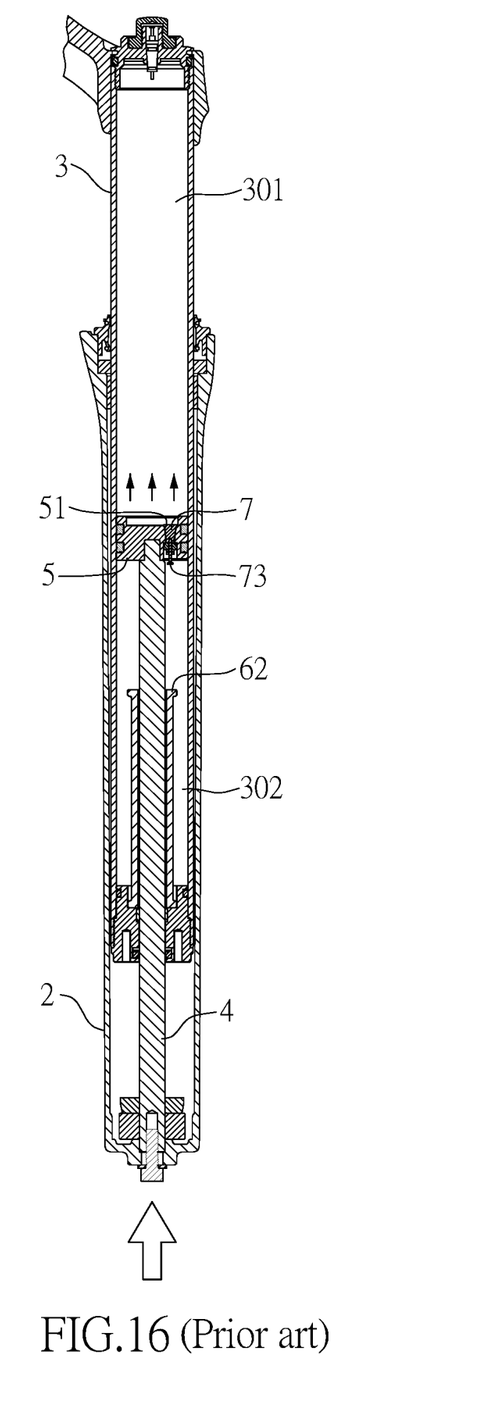
FIG. 16 shows a force is applied to the conventional shock absorbing system.
Figure 17:
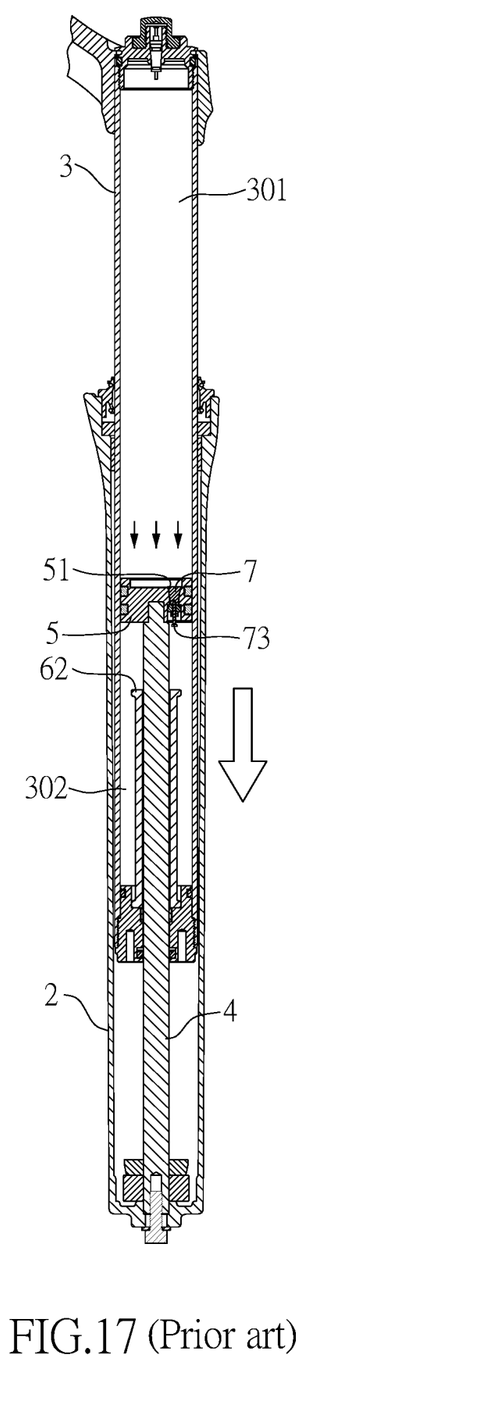
FIG. 17 shows the conventional shock absorbing system when the force in FIG. 16 disappear.

The conventional pneumatic shock absorbing system for a bicycle front fork generally as shown in FIG. 16, and includes an outer tube 2 and an inner tube 3 which is movably inserted into the outer tube 2 to absorb shocks by moving the piston head 5 with the piston rod 4 in the inner tube 3. The balance valve 7 is separated from the distal end 62 to seal the passage 51, such that the first and second chambers 301, 302 do not communicate with each other. The piston head 5 applies a force to the air in the first chamber 301 such that the air pressure in the first chamber 301 is larger than that of the second chamber 302. When the force is disappeared, the pressure in the first chamber 301 pushes the piston head 5 to move toward the lower end of the outer tube 2, so that the piston head 5 together with the piston rod 4 move toward the lower end of the outer tube 2. In the meanwhile, the balance valve 7 still seals the passage 51 as shown in FIG. 17, until the piston head 5 is moved to contact the distal end 62 and activates the operation rod 73 of the balance valve 7. The balance valve 7 then no longer seals the passage 51, and the first and second chambers 301, 302 communicate with each other. The outer tube 2 is able to move relative to the inner tube 3. Although the conventional pneumatic shock absorbing system described above is different from the use of springs, there are shortcomings to be improved.

The present invention intends to provide a shock absorbing system for a bicycle front fork to eliminate shortcomings mentioned above.

SUMMARY OF THE INVENTION

The present invention relates to a shock absorbing system for a bicycle front fork and comprises an outer tube and an inner tube which is inserted into the outer tube. The inner tube includes a piston located therein. A piston tube has its lower end thereof fixed to the outer tube, and the top end of the piston tube extends through the lower end of the inner tube and is connected to the piston. A first chamber is formed in the inner tube and formed between the piston and the top end of the inner tube. A second chamber is formed in the inner tube and formed between the piston and the lower end of the inner tube. A path is formed between the piston and the piston tube. The piston moves along the inner tube when the outer tube moves relative to the inner tube. A manual valve is located in the piston tube and includes a rod and a movable part. The rod includes an extension section extending from the lower end thereof. The extension section protrudes beyond the lower end of the outer tube.

When the extension section is pushed upward, the rod moves upward to switch the path from a sealed status to an opened status so as to communicate the first chamber with the second chamber.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the shock absorbing system of the present invention is installed to a bicycle front fork 100, and comprises an outer tube 200, an inner tube 300, a piston 400, a piston tube 500 and a manual valve 600.

The lower end of the inner tube 300 is movably inserted into the top end of the outer tube 200. The inner tube 300 includes a piston 400 located therein, and a piston tube 500 has its lower end thereof fixed to the outer tube 200, and the top end of the piston tube 500 extends through the lower end of the inner tube 300 and is connected to the piston 400. A first chamber 301 is formed in the inner tube 300 and formed between the piston 400 and the top end of the inner tube 300. A second chamber 302 is formed in the inner tube 300 and formed between the piston 400 and the lower end of the inner tube 300. A path 700 is formed between the piston 400 and the piston tube 500. The piston 400 moves along the inner tube 300 when the outer tube 200 moves relative to the inner tube 300.

The manual valve 600 is located in the piston tube 500 and includes a rod 601 and a movable part 602. The rod 601 includes an extension section 603 extending from the lower end thereof. The extension section 603 protrudes beyond the lower end of the outer tube 200. When the extension section 603 is pushed upward, the rod 601 moves upward to switch the path 700 from a sealed status to an opened status so as to communicate the first chamber 301 with the second chamber 302 as shown in FIGS. 6 to 9. It is noted that the manual valve 603 needs to be pushed one time and does not need to continuously push to adjust the shock absorbing system from being operated by the first chamber 301 only into being operated by the first and second chambers 301, 302.

Figure 1:
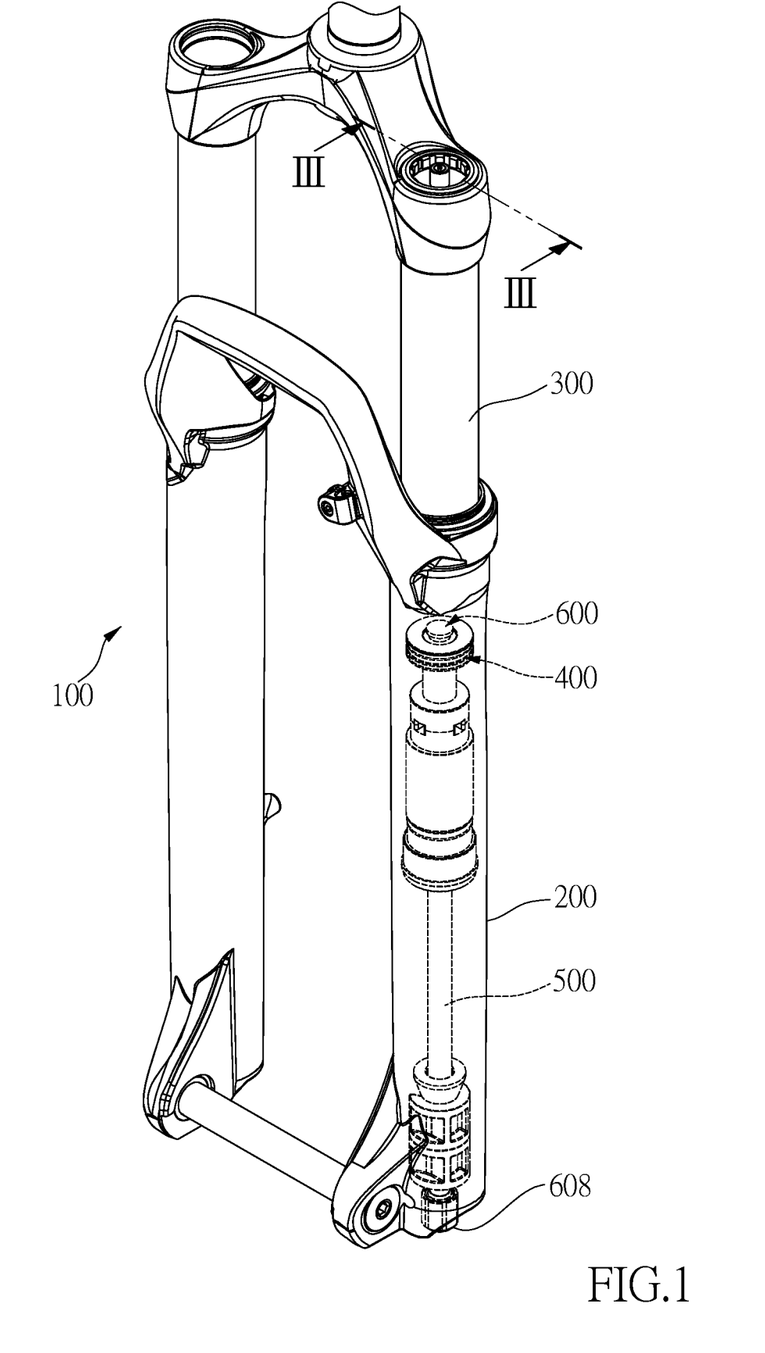
FIG. 1 shows the shock absorbing system of the present invention installed to a bicycle front fork.
Figure 2:
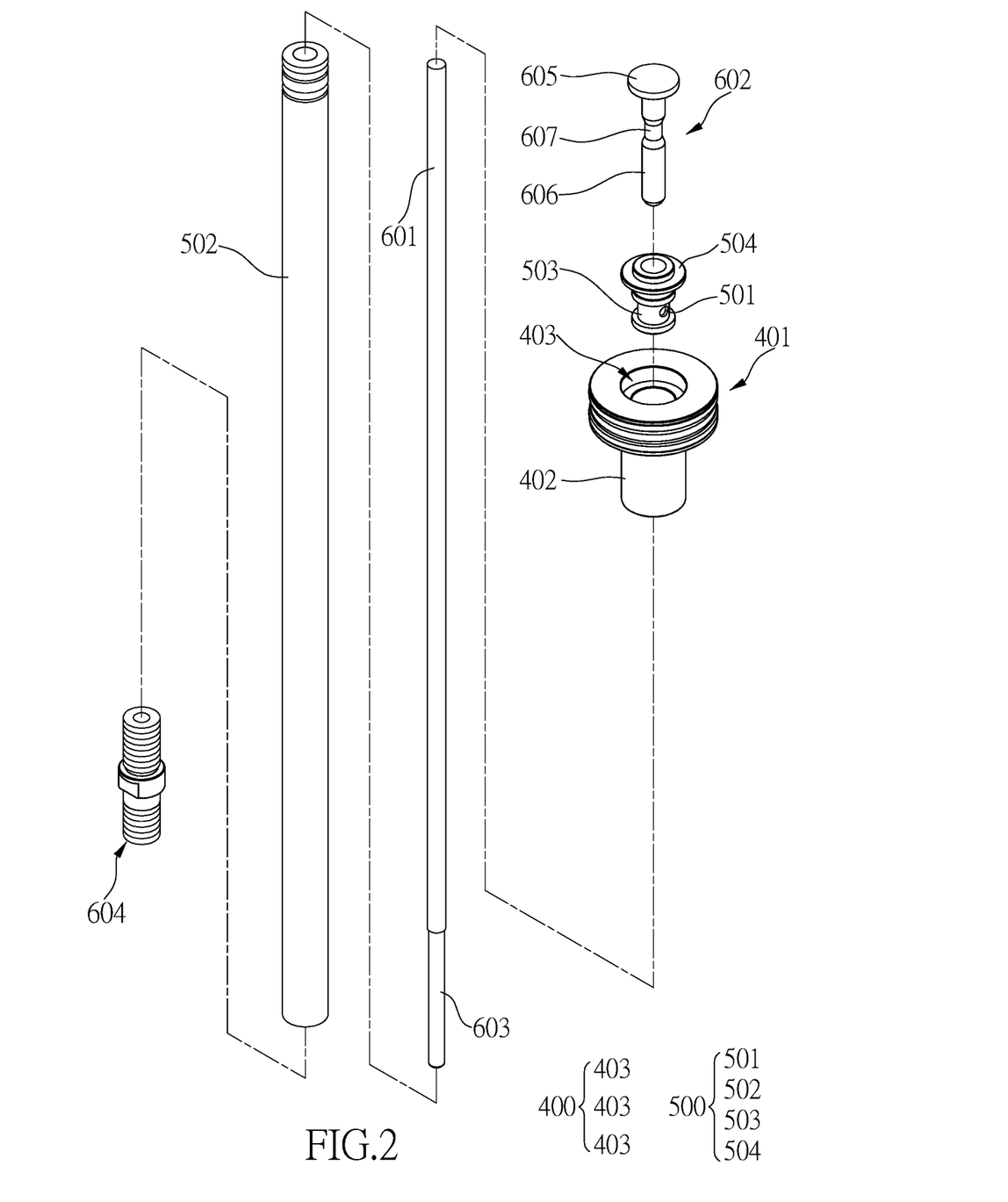
FIG. 2 is an exploded view of the shock absorbing system of the present invention.
Figure 3:
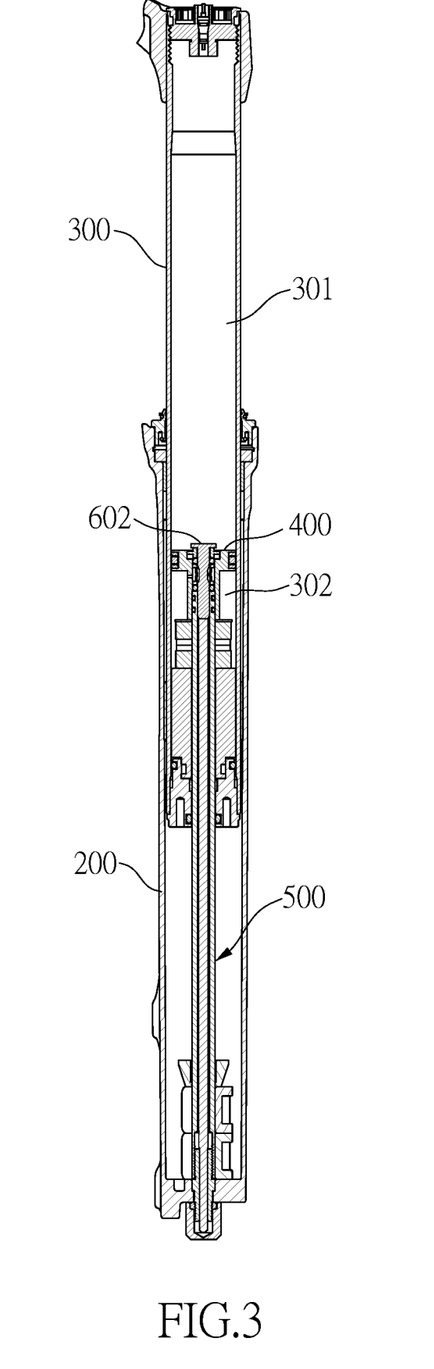
FIG. 3 is a cross sectional view, taken along line III-III in FIG. 1.
Figure 4:
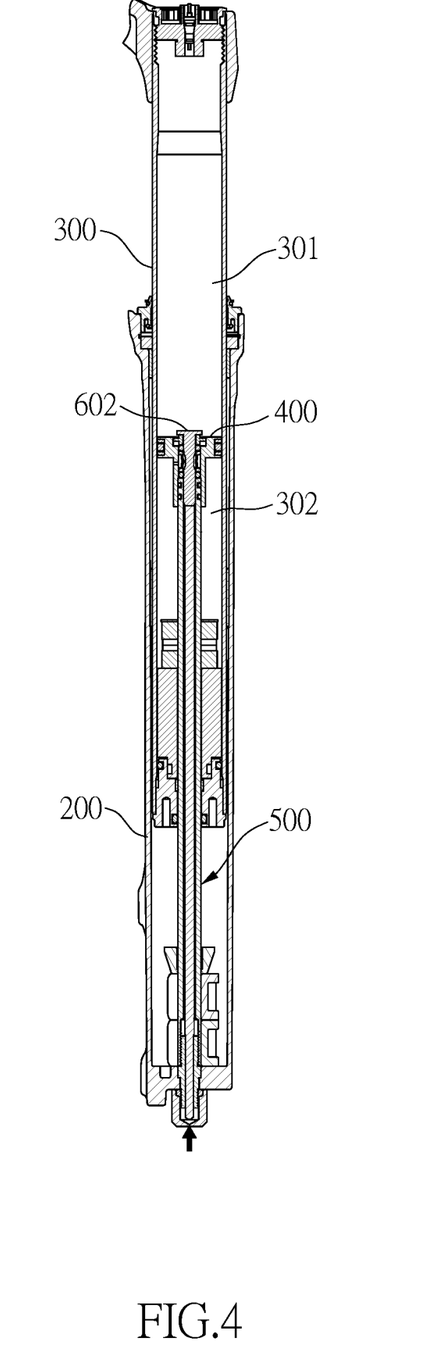
FIG. 4 shows that the outer tube moves relative to the inner tube when a force applies to the shock absorbing system of the present invention.
Figure 5:
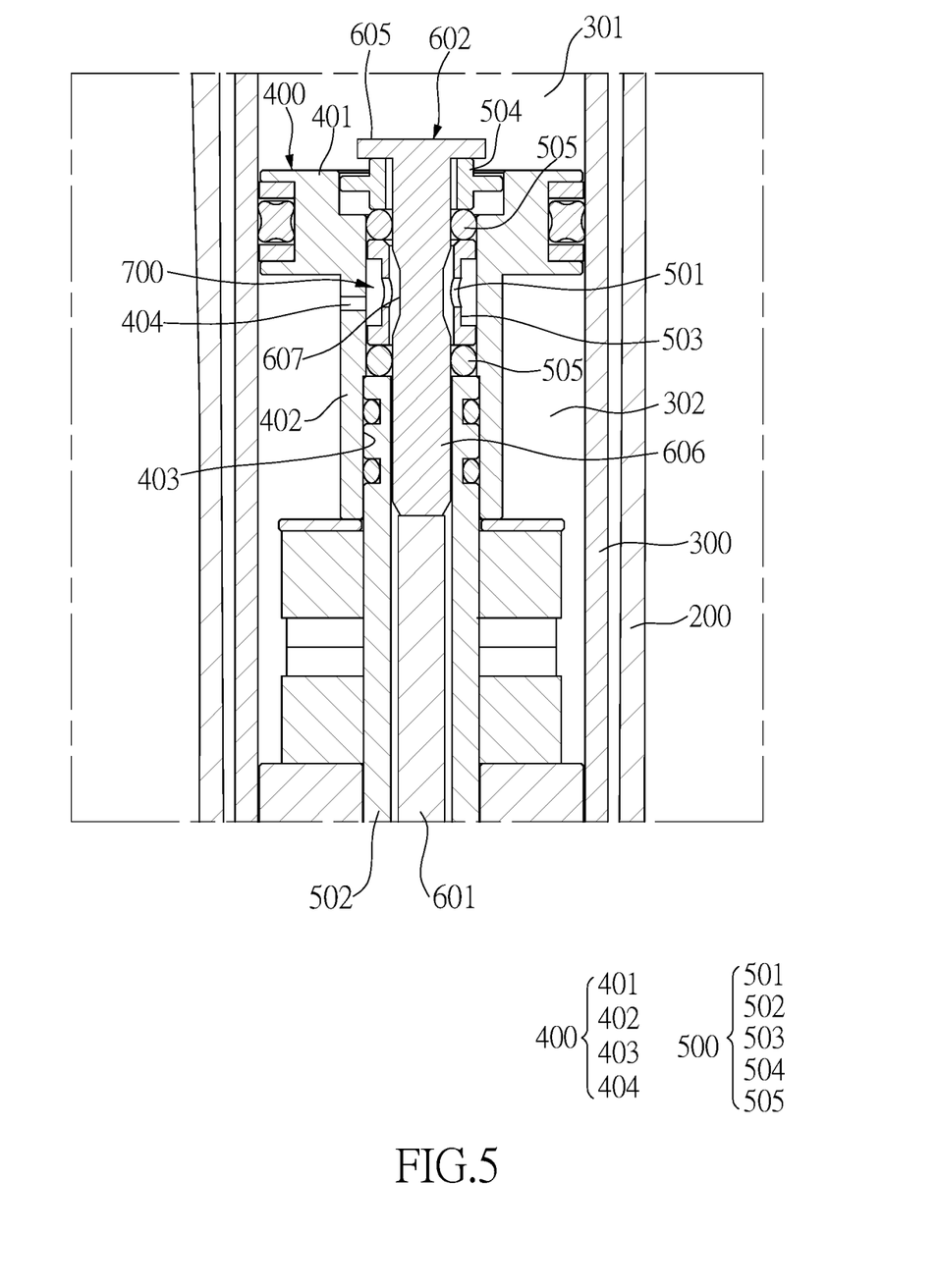
FIG. 5 is an enlarged view to show the connection between the head part, the shank of the piston, and the piston tube.
Figure 6:
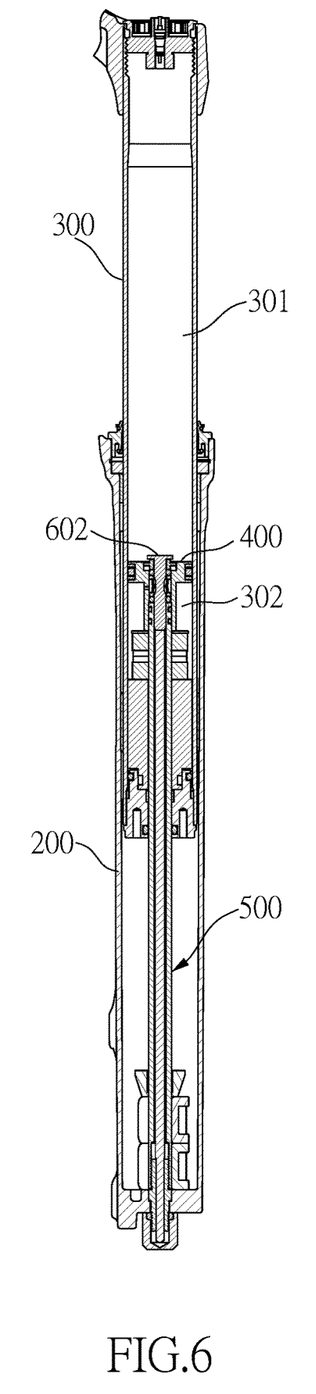
FIG. 6 is a cross sectional view to show the shock absorbing system of the present invention before the manual valve is pushed.
Figure 7:
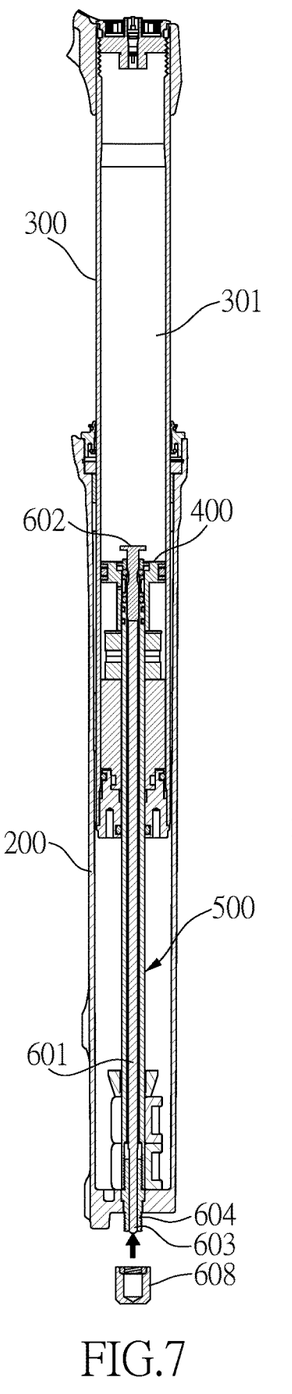
FIG. 7 is cross sectional view to show the shock absorbing system of the present invention wherein the cap is removed, and the manual valve is pushed.
Figure 8:
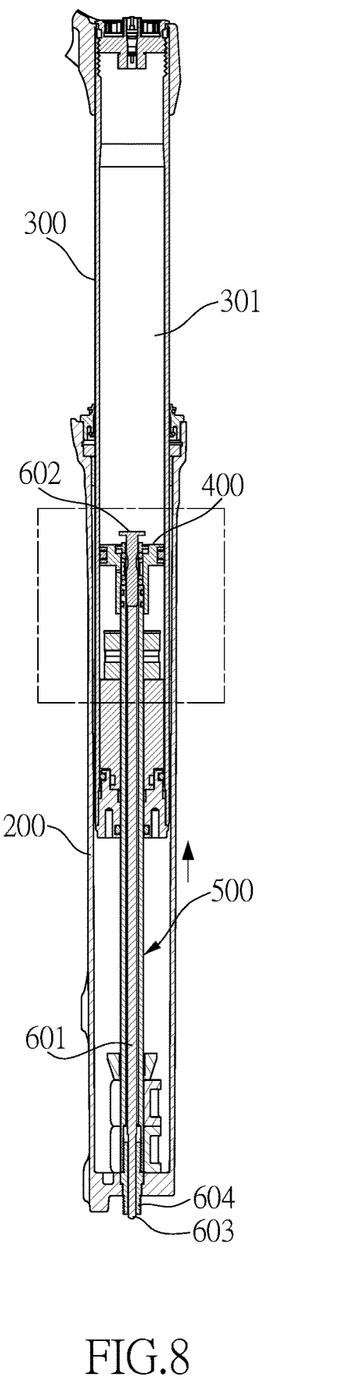
FIG. 8 is cross sectional view to show that the piston and the piston tube are moved, and the outer tube moves relative to the inner tube.
Figure 9:
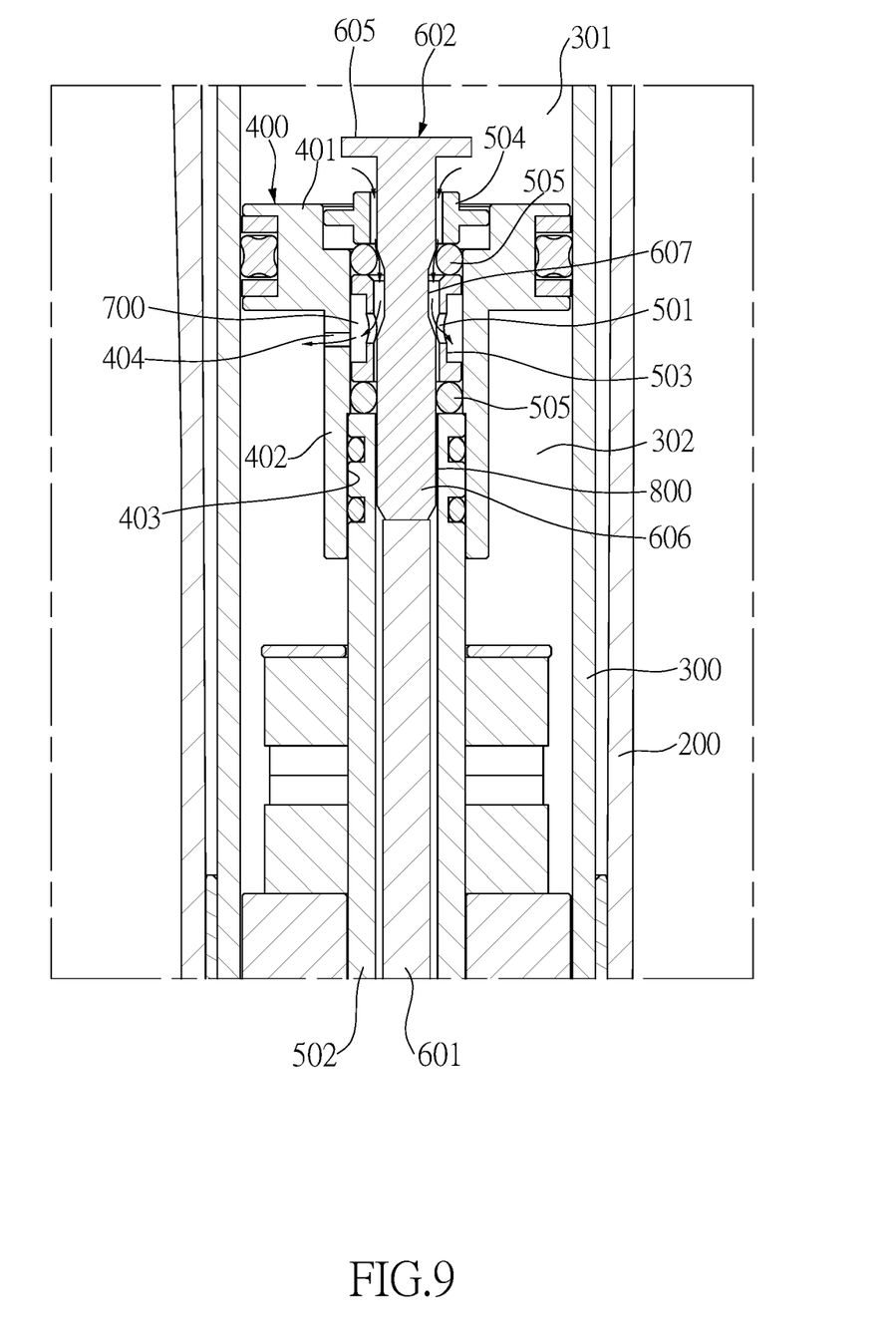
FIG. 9 is an enlarged view to show the enclosed area in FIG. 8.
Figure 10:
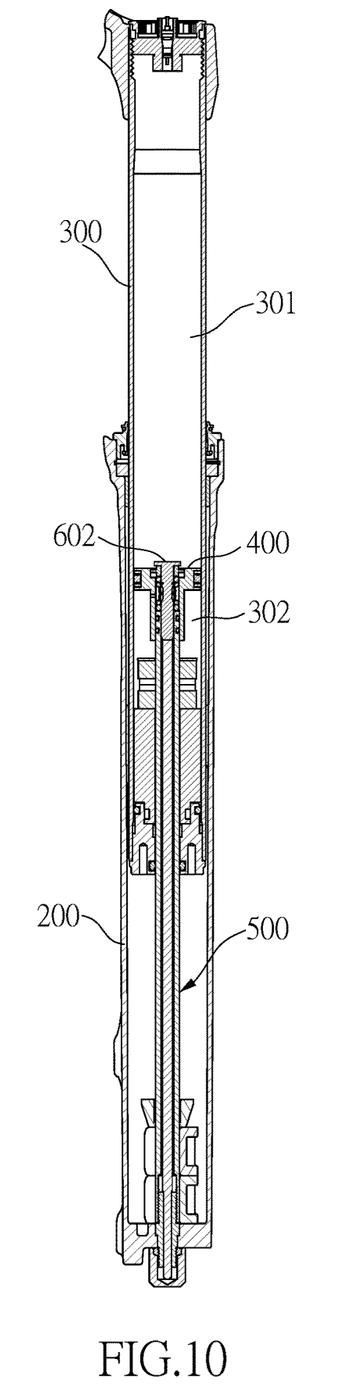
FIG. 10 shows that the manual valve is pushed and the cap is re-capped to the extension section.
Figure 11:
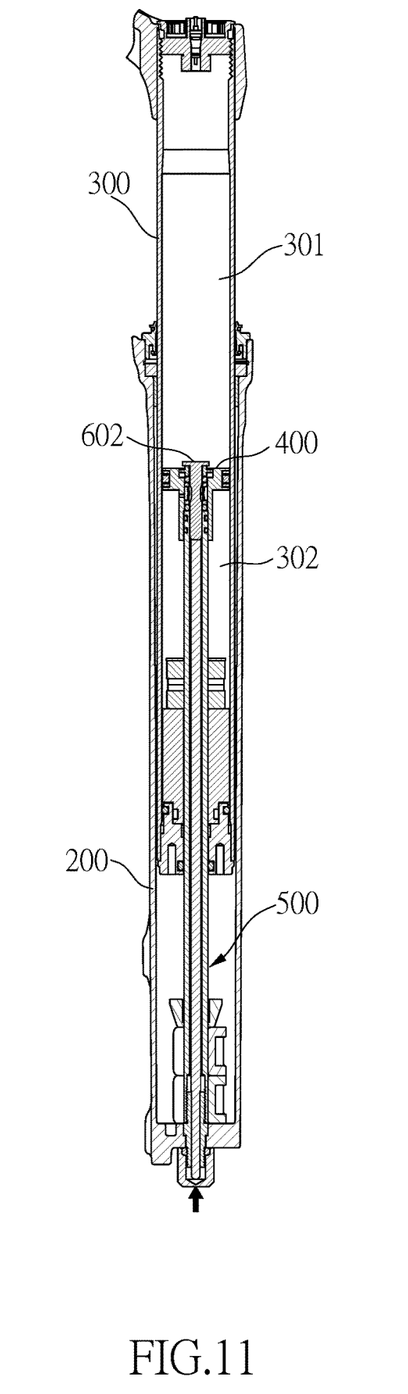
FIG. 11 shows that a force is applied to the shock absorbing system of the present invention as disclosed in FIG. 10.

As shown in FIGS. 3 to 5 which show the shock absorbing system while the manual valve 600 is not yet pushed. As shown in FIGS. 10 and 11 which shown that the manual valve 600 is pushed. The outer tube 200 is applied by a force which is transferred from the ground and is represented by the arrow head in FIG. 4, so that the outer tube 200 moves toward the inner tube 300. The movement of the outer tube 200 drives the piston tube 500 and the piston 400 so that the piston 400 is moved toward the top end of the inner tube 300. The moveable part 602 of the manual valve 600 seals the path 700, the piston 400 compresses the air in the first chamber 301. When the force disappears, the pressure in the first chamber 301 is larger than that of the second chamber 302, so that the piston 400 is pushed toward the outer tube 200. The piston tube 500 is moved with the piston 400 so that the piston tube 500 drives the outer tube 200 to move in the direction away from the inner tube 300. The outer tube 200 moves back to its initial position.

Figure 12:
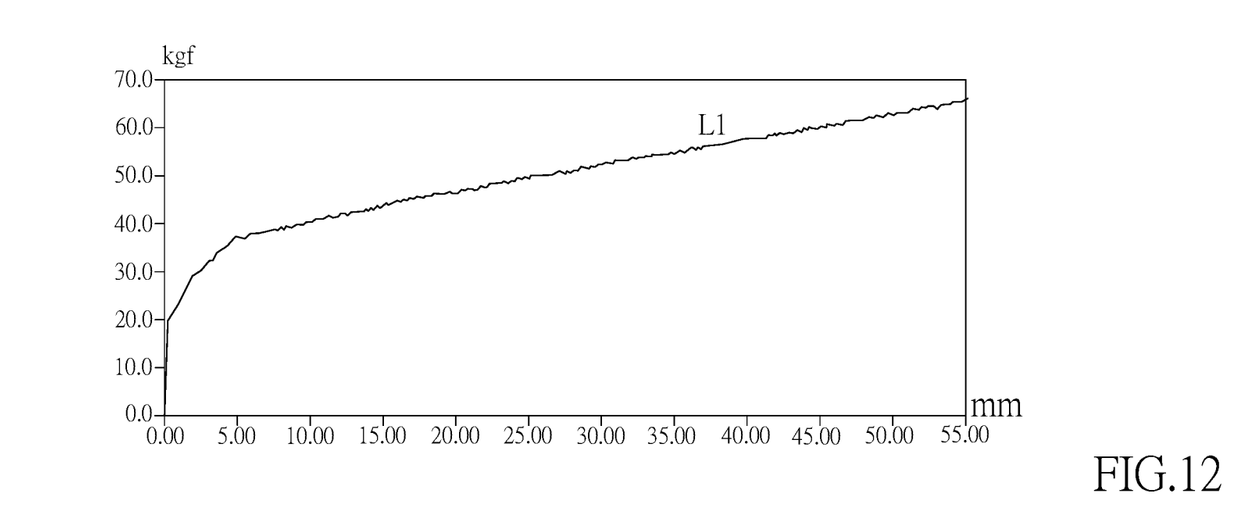
FIG. 12 discloses the curve of the force applied to the shock absorbing system relative to the displacement of the outer tube relative to the inner tube when the manual valve is not operated.
Figure 13:
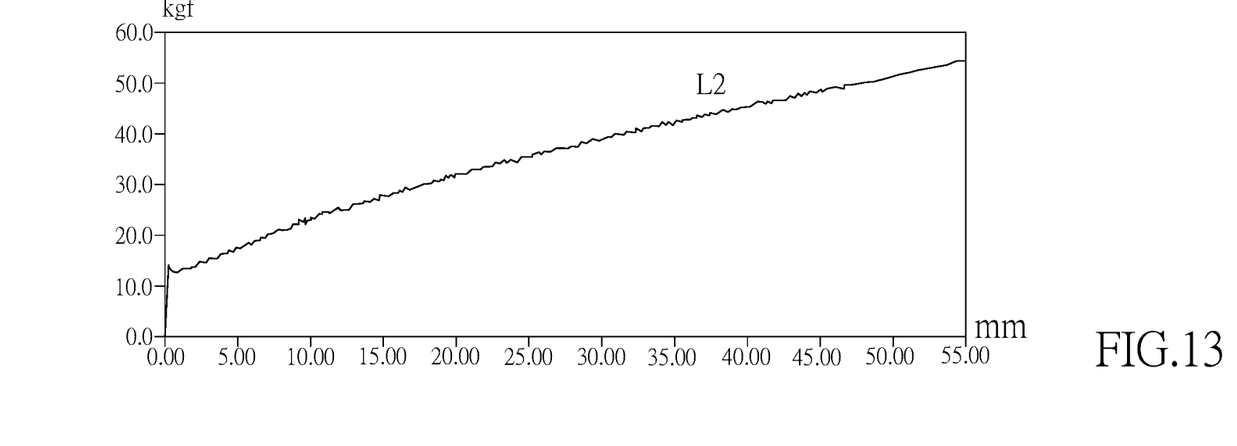
FIG. 13 discloses the curve of the force applied to the shock absorbing system relative to the displacement of the outer tube relative to the inner tube when the manual valve is operated.

The force for activating the shock absorbing system is disclosed in FIGS. 12 and 13. FIG. 12 shows that the manual valve 600 is not yet pushed, the curve L1 of the force applied to the shock absorbing system relative to the displacement of the outer tube 200 relative to the inner tube 300. The force has to be 20 kgf to activate the shock absorbing system. The force rises severely and over 35 kgf when the displacement reaches to 5 mm. The second of the curve L1 in this situation is not linear so that the shock absorbing system performs to hard. The curve L1 becomes linear when it moves away from the section.

FIG. 13 shows that the manual valve 600 is pushed, the shock absorbing system is activated when the force is 15 kgf. The curve L2 is linear and this means that the users can manually push the manual valve 600 when the road condition is rough and not flat.

Specifically, the manual valve 600 includes an end part 604, and the end part 604 is connected into the lower end of the outer tube 200 and connected in the piston tube 500. The movable part 602 is inserted into the top end of the piston tube 500. The pressure in the first chamber 301 is applied to the movable part 602 to seal the path 700 to form the sealed status. The extension section 603 extends through the end part 604 and protrudes beyond the end part 604. When the extension section 603 is pushed toward the movable part 602, the movable part 602 is moved to switch the path 700 from the sealed status to the opened status. The movable part 602 includes a flange 605 extending radially from the top thereof, and an insertion portion 606 integrally extends from the flange 605. The insertion portion 606 is inserted into the piston tube 500. A gap is formed between the insertion portion 606 and the inner periphery of the piston tube. The flange 605 is located in the first chamber 301 and receives the pressure of the first chamber 301 to seal the piston tube 500 so that air in the first chamber 301 cannot flow into the path 700.

The piston 400 includes a head part 401 and a shank 402 which integrally extends from the head part 401. A passage 403 is defined axially through the head part 401 and the shank 402. The shank 402 includes a radial hole 404 defined through the wall thereof. The radial hole 404 communicates with the passage 403.

The piston tube 500 includes a lateral hole 501 defined through the wall thereof. The lateral hole 501 is located corresponding to the radial hole 404. The insertion portion 606 of the movable part 602 includes a neck 607, and the radius of the neck 607 is smaller than that of the insertion portion 606. The piston tube 500 includes a first section 502, a second section 503 and a third section 504. The lower end of the first section 502 is inserted into the end part 604. The top end of the first section 502 is secured to the lower end of the passage 403. The third section 504 is connected to the inner periphery of the upper portion of the passage 403. The second section 503 is secured in the passage 403 and located between the first and third sections 502, 504. The lateral hole 501 is formed in the second section 503. The insertion portion 606 of the movable part 602 extends through the third section 504, the second section 503 and the first section 502. Two seal rings 505 are respectively located between the third section 504, the second section 503, and between the second section 503 and the first section 502.

The path 700 is located corresponding to the third section 504, the second section 503, the lateral hole 501, the radial hole 404 and a portion of the passage 403. A cap 608 is mounted to the lower end of the end part 604 to hide the extension section 603 in the cap 608. The cap 608 has to be removed before the manual valve 600 is pushed. The cap 608 also ensure that the extension section 603 is not pushed unintentionally.

Figure 14:
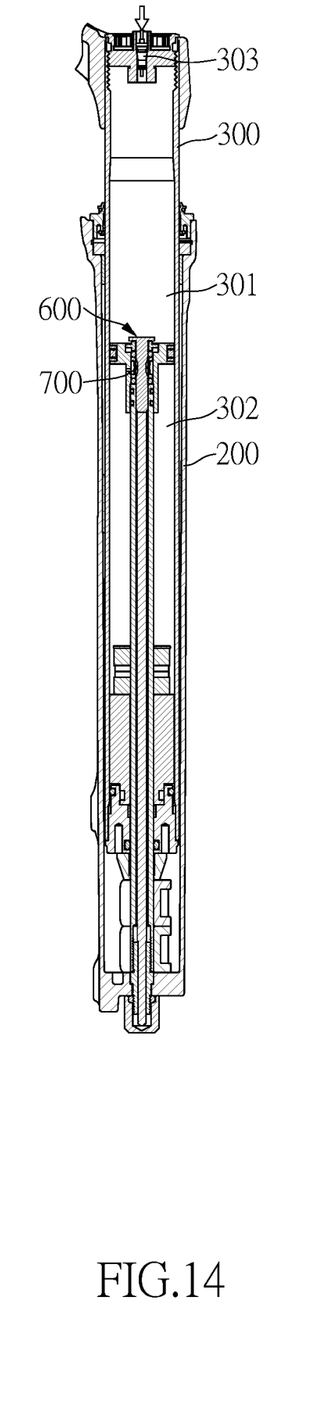
FIGS. 14 and 15 show that air is introduced into the first chamber via the input valve.
Figure 15:
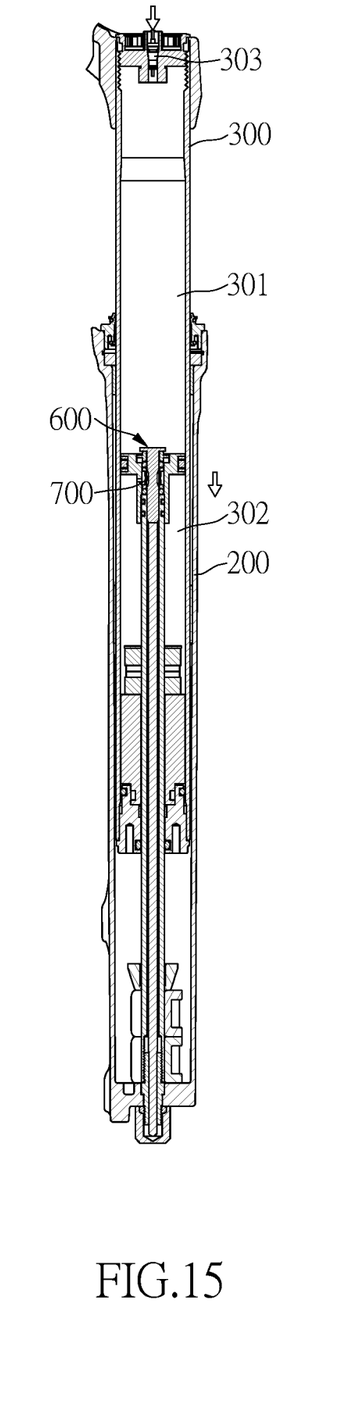

An input valve 303 is connected to the top end of the inner tube 300 and communicates with the first chamber 301. Before the shock absorbing system is put in the market, the manufacturers introduces air into the first chamber 301, while the path 700 is sealed so that the air does not enter into the second chamber 302.

While we have shown and described the embodiment in accordance with the present invention, it should be clear to those skilled in the art that further embodiments may be made without departing from the scope of the present invention.

What is claimed is:

1. A shock absorbing system for a bicycle front fork, comprising:
   an outer tube;
   an inner tube and having a piston located therein, an lower end of the inner tube movably inserted into a top end of the outer tube, a piston tube having a lower end thereof fixed to the outer tube, a top end of the piston tube extending through the lower end of the inner tube and connected to the piston, a first chamber formed in the inner tube and formed between the piston and a top end of the inner tube, a second chamber formed in the inner tube and formed between the piston and the lower end of the inner tube, a path formed between the piston and the piston tube, the piston moving along the inner tube when the outer tube moves relative to the inner tube, and
   a manual valve located in the piston tube and including a rod and a movable part, the rod including an extension section extending from a lower end thereof, the extension section protruding beyond a lower end of the outer tube, when the extension section is pushed upward, the rod moves upward to switch the path from a sealed status to an opened status so as to communicate the first chamber with the second chamber;

wherein the manual valve includes an end part, the end part is connected into the lower end of the outer tube and connected in the piston tube, the movable part is inserted into the top end of the piston tube, a pressure in the first chamber is applied to the movable part to seal the path, the extension section extends through the end part and protrudes beyond the end part, when the extension section is pushed toward the movable part, the movable part is moved to switch the path from the sealed status to the opened status;

wherein the movable part includes a flange extending radially from a top thereof, an insertion portion integrally extends from the flange, the insertion portion is inserted into the piston tube, a gap is formed between the insertion portion and an inner periphery of the piston tube, the flange is located in the first chamber and receives the pressure of the first chamber to seal the piston tube so that air in the first chamber cannot flow into the path;

wherein the piston includes a head part and a shank which integrally extends from the head part, a passage is defined axially through the head part and the shank, the shank includes a radial hole defined through a wall thereof, the radial hole communicates with the passage.

2. The shock absorbing system as claimed in claim 1, wherein the piston tube includes a lateral hole defined through a wall thereof, the lateral hole is located corresponding to the radial hole, the insertion portion of the movable part includes a neck, a radius of the neck is smaller than that of the insertion portion.

3. The shock absorbing system as claimed in claim 2, wherein the piston tube includes a first section, a second section and a third section, a lower end of the first section is inserted into the end part, a top end of the first section is secured to a lower end of the passage, the third section is connected to an inner periphery of an upper portion of the passage, the second section is secured in the passage and located between the first and third sections, the lateral hole is formed in the second section, the insertion portion of the movable part extends through the third section, the second section and the first section.

4. The shock absorbing system as claimed in claim 3, wherein the path is located corresponding to the third section, the second section, the lateral hole, the radial hole and a portion of the passage.

5. The shock absorbing system as claimed in claim 4 further comprising two seal rings which are respectively located between the third section, the second section, and between the second section and the first section.

6. The shock absorbing system as claimed in claim 1, wherein an input valve is connected to a top end of the inner tube and communicates with the first chamber.

7. The shock absorbing system as claimed in claim 1, wherein a cap is mounted to a lower end of the end part to hide the extension section in the cap.

* * * * *